US00RE35925E

United States Patent [19]

Dohr et al.

[11] E Patent Number: Re. 35,925

[45] Reissued Date of Patent: Oct. 20, 1998

[54] APPARATUS FOR CONTROLLING OPERATION OF A RAILCAR DISCHARGE GATE ASSEMBLY HAVING A LOST MOTION MECHANISM FOR UNLOCKING THE GATE PRIOR TO MOVEMENT

[75] Inventors: Jeremy J. Dohr, Kenosha; Robert S. Toms, Racine, both of Wis.; Robert T. Fischer, Homewood, Ill.

[73] Assignee: Miner Enterprises, Inc., Geneva, Ill.

[21] Appl. No.: 727,190

[22] Filed: Oct. 8, 1996

Related U.S. Patent Documents

Reissue of:

[64] Patent No.: 5,353,713
Issued: Oct. 11, 1994
Appl. No.: 130,250
Filed: Oct. 1, 1993

[51] Int. Cl.[6] ..... B16D 7/24

[52] U.S. Cl. ..... 105/310; 705/282.3; 705/310.1; 705/311.2

[58] Field of Search ..... 105/282.1, 282.3, 105/286, 287, 288, 289, 305, 308.1, 308.2, 310, 310.1, 311.1, 311.2

[56] References Cited

U.S. PATENT DOCUMENTS

| | | | |
|---|---|---|---|
| 1,080,280 | 12/1913 | Hult . | |
| 1,083,563 | 1/1914 | Sage . | |
| 1,499,735 | 7/1924 | Hynes . | |
| 1,924,419 | 8/1933 | Sinden . | |
| 2,142,236 | 1/1939 | Campbell . | |
| 2,644,408 | 7/1953 | Dorey . | |
| 2,749,770 | 6/1956 | Dorey . | |
| 3,110,270 | 11/1963 | Ingram . | |
| 3,248,026 | 4/1966 | Kemp . | |
| 3,316,859 | 5/1967 | Floehr . | |
| 3,344,748 | 10/1967 | Dorey | 105/282 |
| 3,387,570 | 6/1968 | Pulcrano et al. . | |
| 3,415,204 | 12/1968 | Pase . | |
| 3,682,105 | 8/1972 | Marulic . | |
| 3,683,820 | 8/1972 | Floehr . | |
| 3,709,152 | 1/1973 | Gutridge . | |

(List continued on next page.)

OTHER PUBLICATIONS

"Specification for New Gravity Outlet Gates on Covered Hopper Cars, S-233-92 ( AAR S-233-92)," Association of American American Railroads, Mechanical Division, *Manual of Standards and Recommended Practices*, pp. C11–C13.4 (Sep. 1, 1992).

Miner AutoLOK Discharge Gate displayed at RSA show, Sep. 1992.

Miner AutoLok Discharge Gate Brochure MEM 1038-992-1M, dated Sep. 1992.

*Primary Examiner*—S. Joseph Morano
*Attorney, Agent, or Firm*—J. W. Harbst; M. L. Goldman

[57] ABSTRACT

An apparatus for controlling operation of a railcar discharge gate assembly including a frame defining a discharge opening with a gate slidably arranged on the frame for movement along a predetermined path of travel between open and closed positions. The apparatus of the present invention includes an operating shaft rotatably supported on the frame for selectively moving the gate between open and closed positions in response to rotation of the shaft. A lock assembly is carried on the frame and is operably coupled to the operating shaft. The lock assembly includes a displacable stop member which, when the gate is closed, extends into the path of travel of the gate to prevent movement of the gate relative to the frame, and which moves in timed relation relative to movement of the gate such that upon rotation of the operating shaft to move the gate to an open position the stop member is automatically removed from the path of travel of the gate prior to movement of the gate toward an open position.

The questions raised in reexamination request No. 90/004, 286, filed Jun. 24, 1996, have been considered and the results thereof are reflected in this reissue patent which constitutes the reexamination certificate required by 35 U.S.C. 307 as provided in 37 CFR 1.570(e).

77 Claims, 4 Drawing Sheets

OTHER PUBLICATIONS

| | | | |
|---|---|---|---|
| 3,710,729 | 1/1973 | Schuller . | |
| 3,837,294 | 9/1974 | Fossett . | |
| 3,893,398 | 7/1975 | Fischer . | |
| 3,933,100 | 1/1976 | Dugge . | |
| 3,956,996 | 5/1976 | Fischer . | |
| 4,094,254 | 6/1978 | Koranda | 105/282 |
| 4,228,696 | 10/1980 | Jablonsky . | |
| 4,253,400 | 3/1981 | Fischer et al. . | |
| 4,256,042 | 3/1981 | Fischer . | |
| 4,262,603 | 4/1981 | Morse . | |
| 4,301,741 | 11/1981 | Chierici . | |
| 4,342,267 | 8/1982 | Blout . | |
| 4,534,298 | 8/1985 | Scott . | |
| 4,843,974 | 7/1989 | Ritter et al. . | |
| 5,046,432 | 9/1991 | Bowler . | |
| 5,272,987 | 12/1993 | Lucas . | |

APPARATUS FOR CONTROLLING OPERATION OF A RAILCAR DISCHARGE GATE ASSEMBLY HAVING A LOST MOTION MECHANISM FOR UNLOCKING THE GATE PRIOR TO MOVEMENT

Matter enclosed in heavy brackets [ ] appears in the original patent but forms no part of this reissue specification; matter printed in italics indicates the additions made by reissue.

FIELD OF THE INVENTION

The present invention generally relates to discharge gate assemblies for railway hopper cars and, more particularly, to an apparatus for controlling operation of a discharge gate assembly between open and closed positions.

BACKGROUND OF THE INVENTION

Railway hopper cars typically include one or more discharge openings through which lading within the car is adapted to be discharged by gravity. A discharge gate assembly including a frame is fitted to the hopper car and defines a discharge opening through which the lading within the car is exhausted. A gate is slidably mounted on the frame for movement between open and closed positions to control the discharge of the lading from the hopper car. The gate is typically moved between positions through a rack and pinion system, including two rows of racks welded to an underside of the gate and two pinions which are arranged on a rotatable operating shaft rotatably mounted on the frame of the gate assembly.

As will be appreciated, it is important to prevent inadvertent opening of the gate. Railway cars are subjected, however, to numerous impact forces, some of which can be quite severe. When a railway car moves down a hump in a classification yard, it likely will impact with other cars on the same track. A filled railway car weighs several tons and has a tendency to gather substantial momentum as it moves along the track. Thus, the impact with a stationary railway car to which it is to be coupled can be exceedingly forceful. While shock absorbers are built into the coupling units on the cars, severe shock loads remain within the body of the car and its contents. Such shock loads can affect the position of the gate. Of course, if a partially opened gate is not recognized, a substantial amount of lading can gravitationally pass through the gate as the cars move from one shipping location to another.

Accordingly, each gate assembly is typically provided with some form of locking mechanism for holding the gate in a closed position. The heretofore known locking mechanisms for holding the gate closed have a myriad of designs. Basically, however, such locking mechanisms include some form of mechanical locking members which are effective to lock the gate in a closed position, but they require both manual opening and manual closing to be effective.

For several reasons, the heretofore known manually operated locking mechanisms are constantly being destroyed when the gates are opened. The operating condition of the locking mechanism is often overlooked when lading is to be discharged from the hopper car. Limited visual access, inconvenient physical access, human error and the increasing demand to quickly unload the rail cars all contribute to the manually operated locking mechanisms being either substantially damaged or completely destroyed. Moreover, high-powered torque drivers are often used to open the gates and result in inadvertent destruction of the locking mechanisms.

Thus, there is a need and a desire for a rail car discharge gate assembly including a lock mechanism which securely maintains the gate in a closed position even under severe impact loading conditions and yet which opens automatically to avoid damage and destruction of the lock mechanism.

SUMMARY OF THE INVENTION

In view of the above, and in accordance with the present invention, there is provided an apparatus for controlling operation of a railway car discharge gate assembly including a frame defining a discharge opening with a discharge gate slidably arranged on the frame. The apparatus of the present invention includes an operating shaft supported on the frame for selectively moving the gate between open and closed positions in response to rotation of the shaft. A lock assembly is carried on the frame and is preferably coupled to the operating shaft. The lock assembly includes a displacable stop member which, when the gate is in its closed position, extends into the path *or plane* of travel of the gate to prevent movement of the gate relative to the frame, and which is driven in timed relation relative to movement of the gate such that upon rotation of the operating shaft to move the gate to an open position the stop member is automatically removed from the path *or plane* of movement of the gate prior to movement of the gate toward its open position.

In a preferred form of the invention, the operating shaft is operably coupled to the gate through a rack and pinion drive mechanism. The drive mechanic includes a pair of laterally spaced pinion gears mounted on the operating shaft and which engage laterally spaced rows of racks welded or otherwise affixed to an underside of the gate.

The stop member of the lock assembly is mounted on the frame for generally vertical movement into and out of the path of travel of the gate. In the most preferred form of the invention, the stop member is pivotally mounted for movement about an axis extending generally parallel to the axis of rotation of the operating shaft. When the gate is in a closed position, the stop member is urged into wedging relation with an edge of the gate thereby preventing displacement of the gate relative to the frame.

The stop member of the lock assembly is biased into engagement with the gate thus inhibiting inadvertent movement of the stop member upon impact loading of the rail car. In one form of the invention, a spring resiliently urges the stop member into the path of improvement of and preferably into engagement with the gate. In an alternative embodiment the stop member is configured with a counterweight for naturally causing the stop member to be urged toward engagement with the gate.

The present invention further includes a drive which is responsive to rotation of the operating shaft for positively removing the stop member from the path of movement of the gate. In a preferred form of the invention, the drive includes an actuator mounted on the operating shaft for positively displacing the stop member from the path of travel of the gate upon rotation of the operating shaft. In a most preferred form of the invention, the actuator includes a cam having a series of lobes peripherally arranged thereabout.

A salient feature of the present invention concerns the ability to automatically remove the stop member of the lock assembly from the path of movement of the gate prior to movement of the gate toward its open position. To accomplish these ends, the drive includes a lost motion mechanism interposed between the operating shaft and the stop member for automatically effecting in sequential order and in response to rotation of the operating shaft displacement of the stop member from the path of gate travel followed by movement of the gate toward an open position. In a most preferred form of the invention, the lost motion mechanism permits the operating shaft to be rotated through a predetermined angle of free rotation without causing linear displacement of the door toward its open position. The lost motion mechanism preferably incorporates a delay before the pinions are coupled to the shaft while allowing the stop member to be immediately responsive to rotation of the shaft. Preferably, an initial dwell embodied in the lost motion mechanism prevents rack and pinion backlash from prematurely disengaging the stop member of the lock assembly.

A major advantage of the present invention involves its simplistic operation. The stop member of the lock assembly is biased into the path of movement of the gate thereby preventing inadvertent displacement of the gate relative to the frame and thus ensuring that the gate is maintained in a closed position notwithstanding the impact loads which tend to urge the gate toward an open position. When the operating shaft is purposefully rotated to open the gate, the stop member of the lock assembly is automatically displaced prior to movement of the gate. After the operating shaft is rotated through a predetermined angle of rotation, the gate is moved toward an open position without concern for damage to the lock assembly. Upon return of the gate to the closed position, the stop member of the lock assembly is automatically returned to a position wherein it lies in the path of movement of the gate thereby preventing inadvertent displacement of the gate.

Numerous other features and advantages of the present invention will be come readily apparent from the following detailed description, the accompanying drawings, and the appended claims.

DETAILED DESCRIPTION OF THE INVENTION

Figure 1:
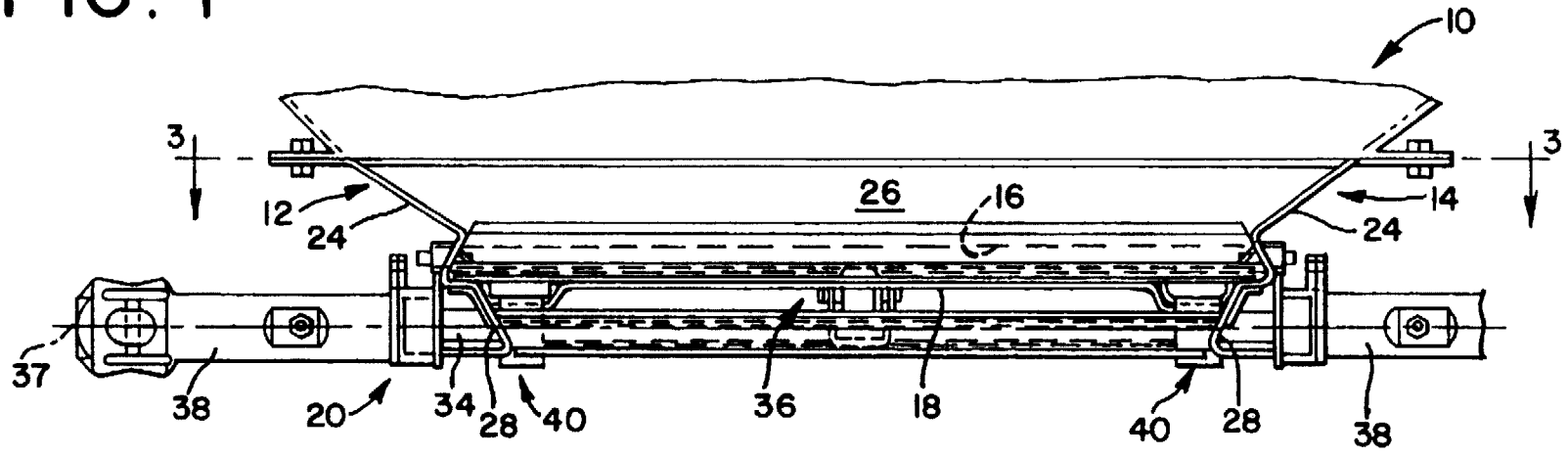
FIG. 1 is a rear elevational view of a railway hopper car discharge gate assembly embodying features of the present invention.

While the present invention is susceptible of embodiments in various forms, there is shown in the drawings two preferred embodiments hereinafter described with the understanding that the present disclosure is to be considered as exemplifications of the invention, and are snot intended to limit the invention to the specific embodiments illustrated.

Figure 2:
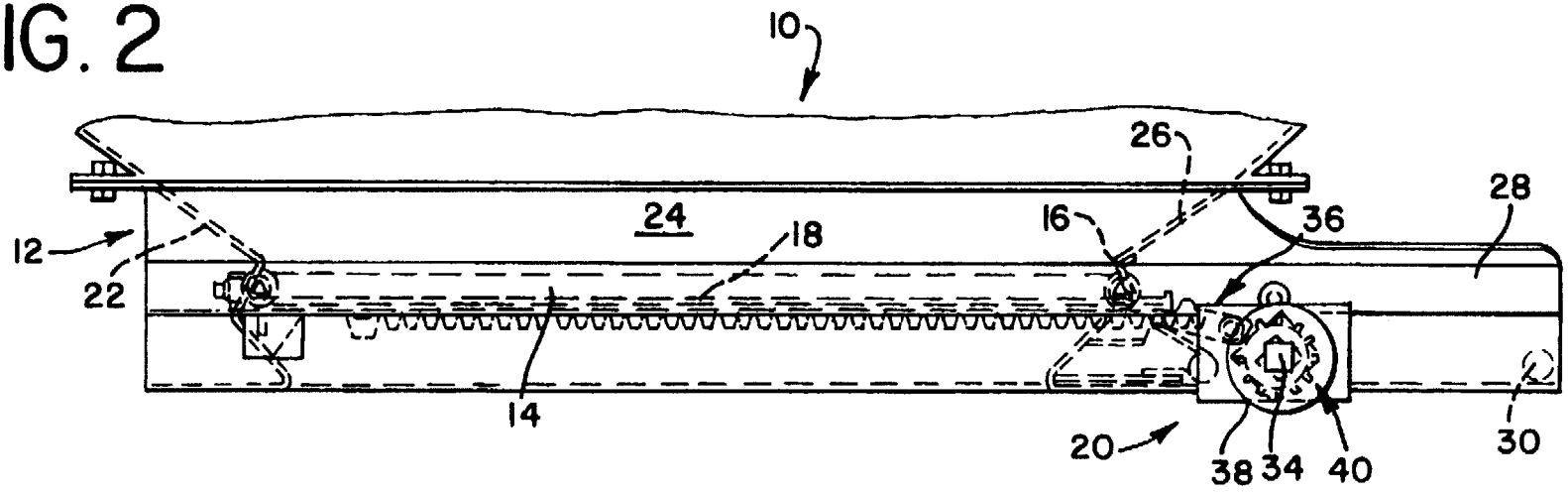
FIG. 2 is a side elevational view of the discharge gate assembly illustrated in FIG. 1.

Referring now to the drawings, wherein like reference numerals refer to like parts throughout the several views, there is schematically illustrated in FIGS. 1 and 2 a railway car hopper outlet generally indicated by reference numeral 10. It will be understood by those skilled in the art that a railway hopper car may have more than one outlet provided thereon. Since the outlets are substantially similar, however, only one outlet is shown for purposes of this description. Suffice it to say, the outlet 10 is arranged at the lower end of a conventional hopper section of a railroad hopper car.

To control the discharge of lading from the outlet 10, a discharge gate assembly 12 is arranged in combination with each outlet. The gate assembly 12 includes a frame 14 defining a discharge opening 16 with a door or gate 18 mounted on the frame 14 for movement between open and closed positions. Operation of the gate 18 is controlled by an apparatus 20 which is the subject of this invention.

Figure 3:
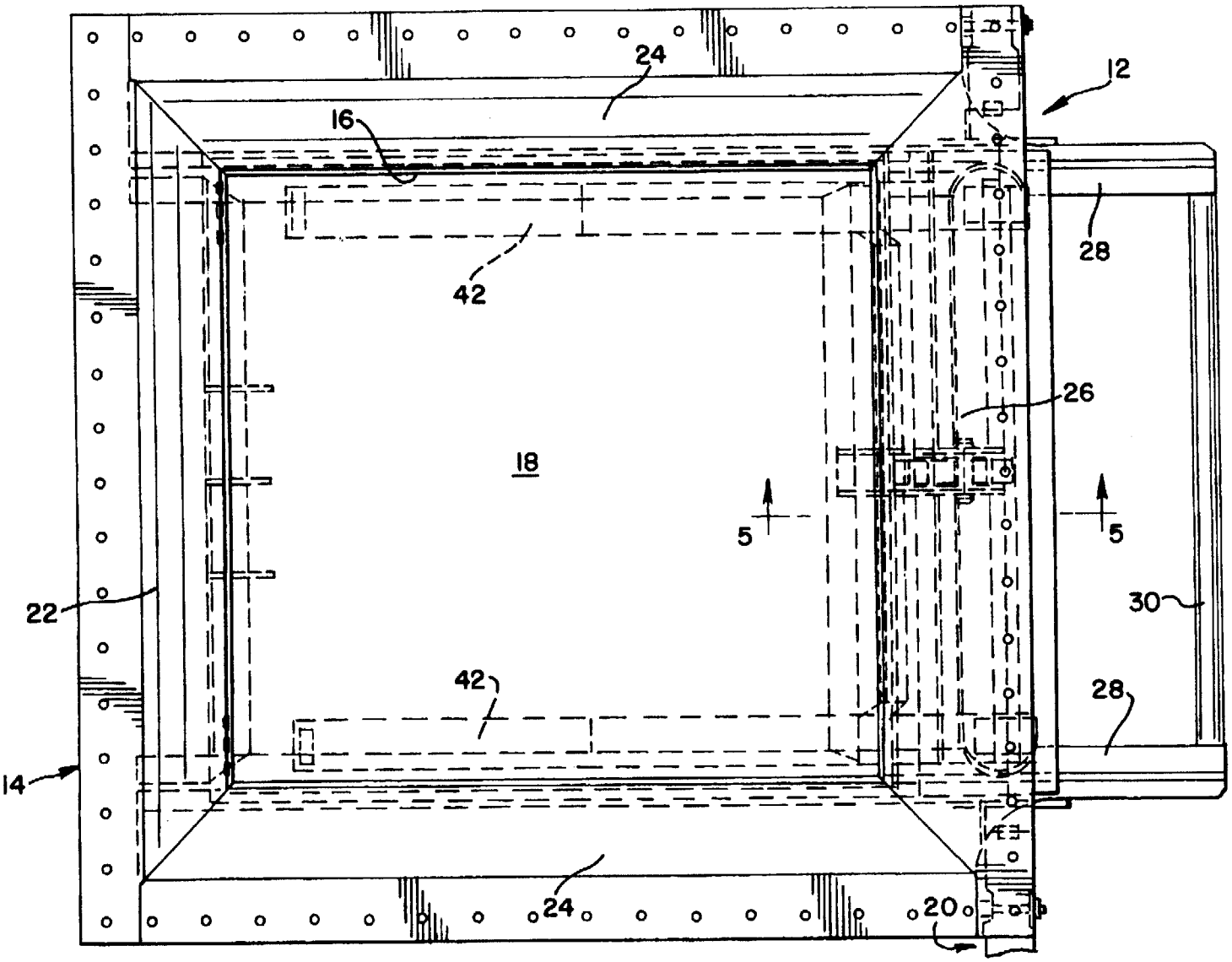
FIG. 3 is a sectional view taken along line 3—3 of FIG. 1.

As shown in FIG. 3, frame 14 preferably has a rectangular configuration including a front frame section 22, side frame sections 24, and a rear frame section 26. In the illustrated embodiment, the sections 22, 24 and 26 of frame 14 define coplanar channels (not shown) which slidably accommodate peripheral edges of the gate 18 and define a path of travel for the gate between open and closed positions thereof. In the illustrated embodiment, the gate 18 has a generally horizontal and rectangular configuration which is slidable across the discharge opening 16 to close same and is movable to a second or open position away from the discharge opening 16.

Projecting away from the side frame sections 24 in parallel relation are extension assemblies 28 which support the gate 18 when it is moved to an opened position. The rear ends of the extension assemblies 28 are preferably interconnected by a suitable transverse support 30.

Returning to FIGS. 1 and 2, the apparatus 20 for controlling operation of the gate 18 between open and closed position generally includes an operating shaft 34 and a lock assembly 36 operably coupled to the operating shaft 34. In the illustrated embodiment, the operating shaft 34 transversely extends across a rear end of and beneath the gate 18. The operating shaft is rotatably about a fixed axis 37 and is supported on opposite sides by the extension assemblies 28. Operating shaft 34 has a capstan 38 at both ends to receive a conventional opening bar used to rotate the shaft 34.

Figure 4:
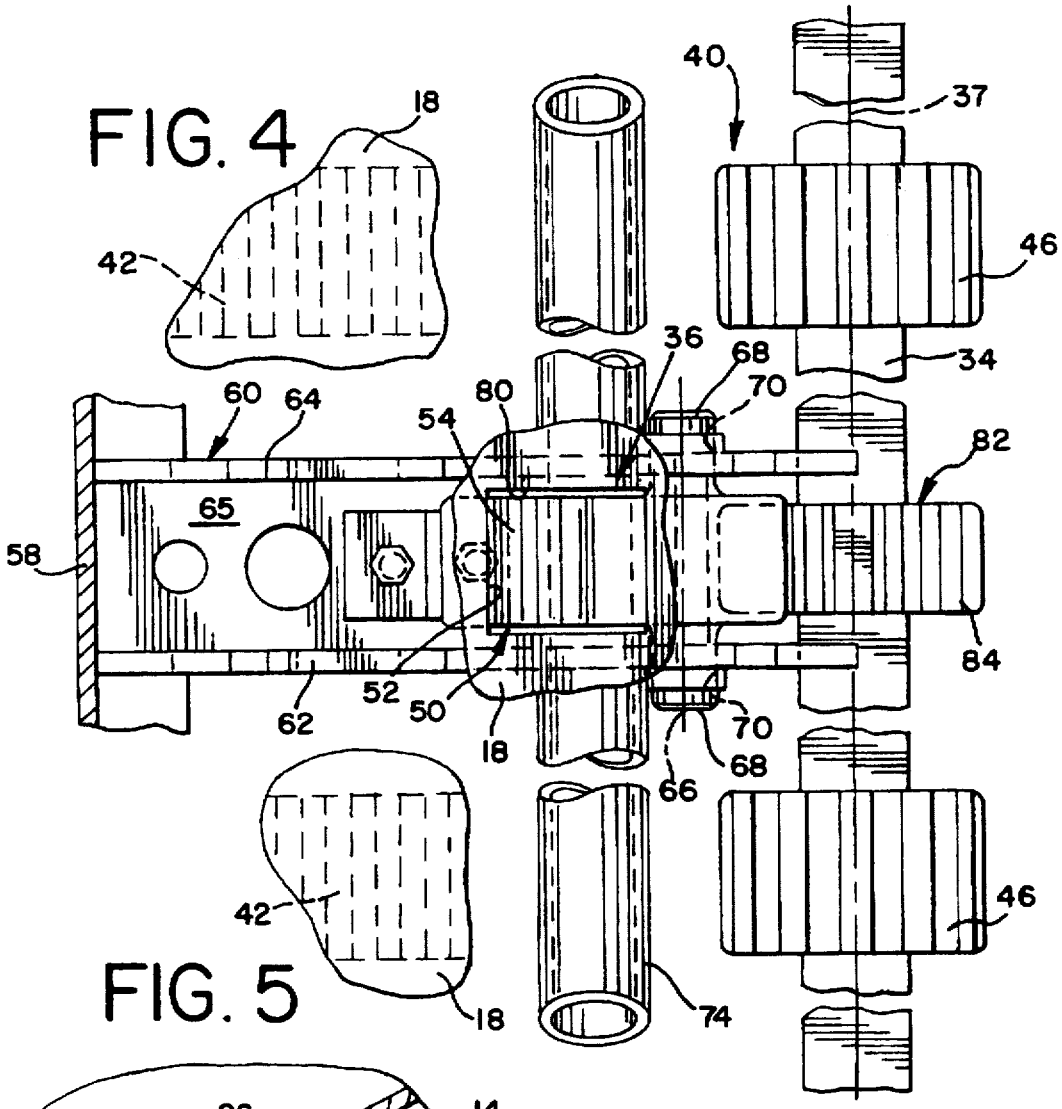
FIG. 4 is an enlarged fragmentary plan view of a lock assembly associated with the present invention.

The operating shaft 34 moves the gate 18 forwardly and rearwardly between open and closed positions through an operable coupling including a rack and pinion drive mechanism generally indicated by reference numeral 40. As shown in FIG. 4, the rack and pinion drive mechanism 40 includes a pair of laterally spaced rack members 42 which arm fixed to an underside 44 (FIG. 5) of gate 18. A pair of pinion gears 46 are slidably received about the operating shaft 34 and have a meshing engagement with the rack members 42. Thus, the racks 42 are simultaneously moved in timed relation relative to each other by the pinion gears 46.

Figure 5:
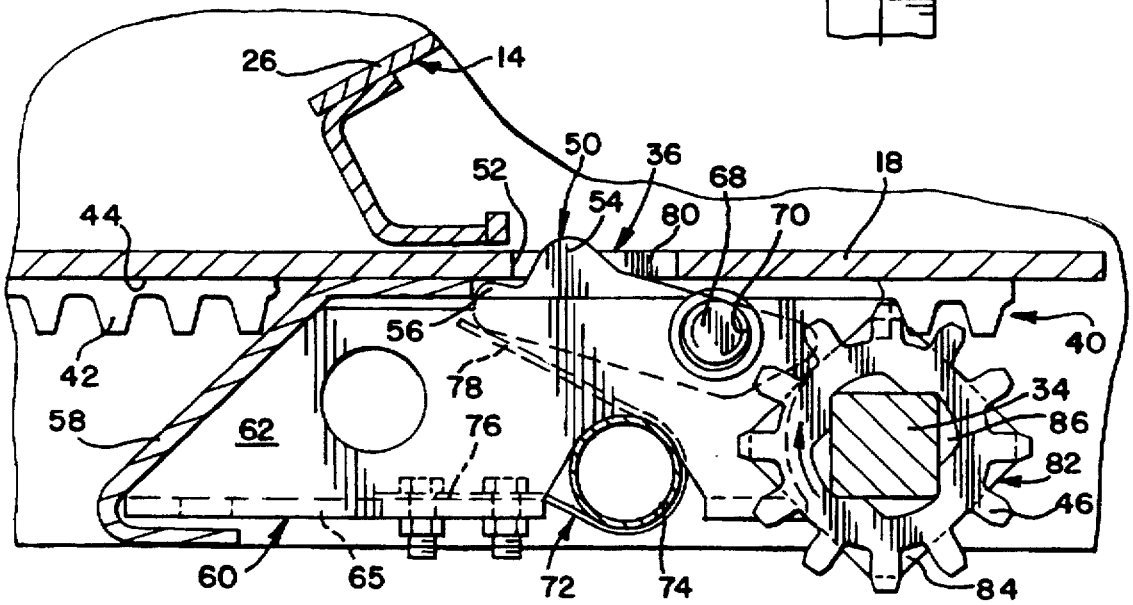
FIG. 5 is a sectional view taken along line 5—5 of FIG. 3 in showing the lock assembly in a locked position.

The lock assembly 36 is carried on the frame 14 and includes a stop member 50. As shown in FIG. 5, when gate 18 is in a forward or closed position, the stop member 50 extends into the predetermined path of travel to positively engage an edge 52 of the gate 18 thereby preventing movement of the gate 18 relative to the frame 14. In the illustrated embodiment, the stop member 50 includes a displacable lever 54 which is mounted to the frame 14 for generally vertical movement relative to the path of travel of the gate 18. As shown, a forward end of the lever 54 is preferably configured with a lip or projection 56. The lip or projection 56 on lever 54 is configured to engage the undersurface 44 of gate 18 thereby limiting vertical travel of the lever 54 relative to the gate while ensuring that the stop member 50 is positioned to engage or wedge against edge 52 of the gate 18.

As shown in FIGS. 4 and 5, a support brace 58 transversely extends beneath the gate 18 and between the side frame sections 24 (FIG. 1) of the frame 14 to add strength and stability to the frame 14. A generally U-shaped lock bracket 60 is secured as by welding or the like intermediate the ends of the brace 58. As shown, bracket 60 includes a pair of parallel and generally vertical arms 62 and 64 which extend rearwardly from the brace 58 and are joined to each other by a transverse arm 65.

In a most preferred form of the invention, lever 54 of stop member 50 is pivotally mounted to the lock bracket 60 to rock about an axis 66 (FIG. 4) extending generally parallel to the rotational axis 37 of the operating shaft 34. A pair of axially aligned pins 68 extend outwardly from opposite sides of the lever 54 and are rotatably captured within axially aligned apertures 70 defined by the vertical arms 62 and 64 of lock bracket 60.

In that form of the invention illustrated in FIG. 5, a spring 72 resiliently urges the stop member 50 vertically into wedging engagement with edge 52 of gate 18 thereby preventing linear movement of the gate 18 relative to the frame 14. As shown in FIG. 5, spring 72 has a generally U-shaped configuration which fits about another support brace 74 transversely extending beneath the gate 18 between side frame sections 24 of the frame 14. One leg 76 of the spring 72 is suitably fastened to arm 65 of the lock bracket 60, while the opposite leg 78 of spring 74 engages an underside of the lever 54 in a manner urging the stop member 50 of the lock assembly 36 into the wedging engagement with the gate 18.

In the illustrated form of the invention, the gate 18 defines a generally rectangular opening or aperture 80. The edge 52 which is engaged by the stop member 50 defines a peripheral edge of the aperture 80. It will be appreciated, however, that it is well within the spirit and scope of the present invention that the stop member 50 engage any suitable edge of the gate 18 so as to prevent movement of the gate 18 relative to the frame 14.

Figure 6:
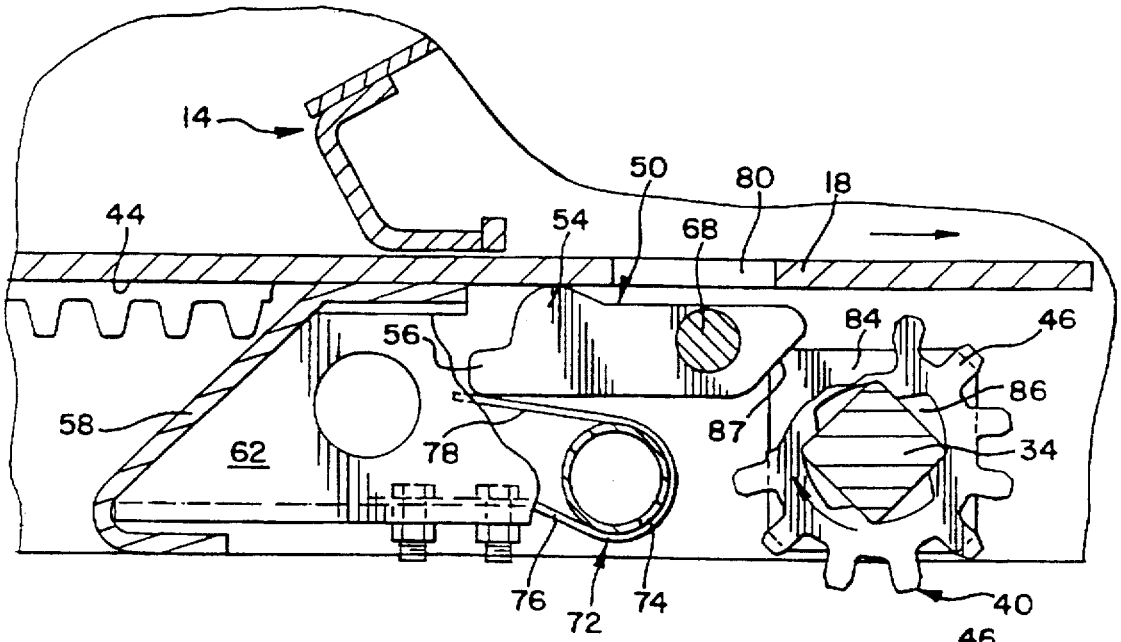
FIG. 6 is a view similar to FIG. 5 showing the lock assembly of the present invention in a released position.

To affect operation of the lock assembly 36 in timed relation to rotation of the operating shaft 34, the present invention further comprises a drive including an actuator 82 for positively removing the stop member 50 from the path of movement of the gate 18. In the illustrated embodiment, the actuator 82 is in the form of a cam 84 which rotates with the operating shaft 34. In the illustrated embodiment, cam 84 has four lobes symmetrically arranged about the periphery thereof. Only one lobe of the cam is actually accountable for positively removing the stop member 50 from the path of movement of the gate 18. As shown in FIG. 6, the cam 84 coacts with a suitable camming surface [86] *87* on the lever 54 thereby removing the lever 54 from the path of movement of the gate assembly.

The drive for automatically positioning the stop member 50 relative to the gate 18 further embodies a lost motion mechanism which allows the operating shaft 34 to be rotated through a predetermined angle of free rotation. As used herein, the term "free rotation" means that rotation of the operating shaft suitable to disengage the lock assembly 36 prior to effecting linear displacement of the gate 18 toward an open position. Notably, in the illustrated embodiment, shaft 34 has a generally square cross-sectional configuration. In the preferred embodiment the lost motion mechanism involves providing each of the pinion gears 46 of the rack and pinion drive mechanism 40 with a slot 86 which transversely passes through each pinion gear 46 and which has a configuration specifically related to the cross-sectional configuration of the operating shaft 34.

Figure 7:
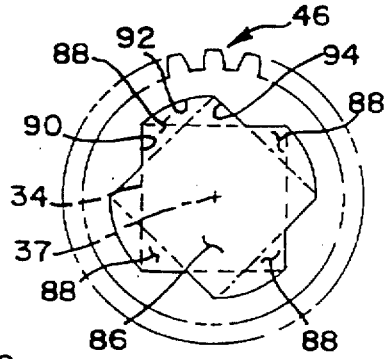
FIG. 7 is a schematic elevational view of a pinion gear forming part of the present invention.

As shown in FIG. 7, slot 86 has a duodecimal surface configuration which is preferably centered upon the axis 37 of the operating shaft 34 and defines a rotary path for the operating shaft 34 relative to each pinion gear 46. Each slot 86 preferably includes four recesses 88 which are joined to each other and which are equally disposed about the axis 37 of the operating shaft 34. Each recess 88 is defined by first, second, and third walls or surfaces 90, 92 and 94, respectively. As will be appreciated, if the cross-sectional configuration of the operating shaft 34 were other than square, the configuration of the slot 86 may likewise be altered to accommodate a predetermined angle of free rotation of the operating shaft 34.

When the gate 18 is in a closed position and the stop member 50 of the lock assembly 36 is in engagement with the gate 18, the operating shaft 34 is disposed as shown in dotted lines in FIG. 7 within the slot 86 of each pinion gear 46. As such, the outer surface of the operating shaft 34 extends generally parallel to and likely engages the wins or surfaces 90 of the recesses 88. The wall or surface 92 of each recess 88 preferably has a clear configuration and has a radius equal to one-half the distance between diametrically opposed corners of the operating shaft 34. Wall or surface 94 of each recess 88 defines the limit of free rotational travel of the operating shaft 34.

At the limit of its free rotational travel, the outer surface of the operating shaft 34 is disposed as shown in dot and dash lines in FIG. 7 within the slot 86 of each pinion gear 46. As such, the outer surface of the operating shaft 34 extends gently parallel to and likely engages walls or surfaces 94 of the recesses 88. As will be appreciated, further rotation of the operating shaft 34 from the dot and dash phantom line position illustrated in FIG. 7 will result in rotation of the pinion gears 46 and, thus, movement of the gate 18 toward an open position. It is important to note, however, that the operating shaft 34 is allowed a predetermined angle of free rotation extending between surfaces 90 and 94 of each recess 88 before turning movement will be imparted to the pinion gears 46. In the illustrated embodiment, the predetermined angle of free rotation of the operating shaft 34 equals about a 45° delay before the operating shaft 34 is coupled to the pinion gears 46. It should be appreciated, however, that alternative delays of varying degrees can likewise be incorporated into the lost motion mechanism without departing from the spirit and scope of the present invention.

Notably, the drive actuator 82 rotates with the operating shaft 34. In the illustrated embodiment the cam 84 for the lock assembly 36 has an initial dwell period of about 25° of operating shaft rotation before a lobe on the cam 84 contacts surface [86] *87* on the lever 54. An additional 20° of operating shaft rotation permits complete disengagement of the stop member 50 from the gate 18. As will be appreciated, the initial dwell period prevents the rack and pinion drive mechanism 40 from prematurely disengaging the stop member 50.

Figure 8:
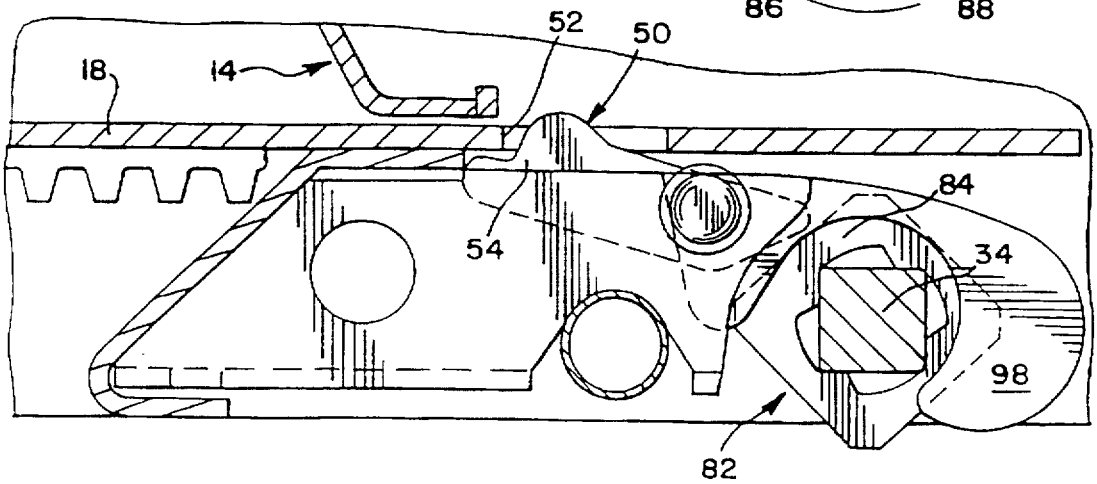
FIG. 8 is a view similar to FIG. 5 but showing an alternative embodiment of a lock assembly according to the present invention.

An alternative apparatus for controlling operation of the gate 18 is illustrated in FIG. 8. The apparatus shown in FIG. 8 is substantially similar to that discussed above. In the embodiment illustrated in FIG. 8, the stop member 50 is biased into an engaged position with the gate 18 under the influence of a counterweight 98. As shown, the counterweight 98 is formed as part of the lever 54 and is configured to extend about the operating shaft 34. In the embodiment shown in FIG. 8, the counterweight 98 tends to naturally bias the stop member 50 upwardly into engagement with the edge 52 of the gate 18 thereby preventing movement of the gate 18 relative to the frame 14.

During transport, and as shown in FIG. 5, the gate 18 is in a closed position thereby inhibiting the discharge of lading through the discharge opening 16 of the gate assembly. When the gate 18 is in a closed position, the stop member 50 is arranged in the path of movement of the gate thereby preventing movement of the gate 18 relative to the frame 14. Preferably, the lever 54 of stop member 50 is wedged against the edge 52 of the gate 18. In the illustrated embodiment, either the influence of spring 72 or the counterweight 98 tends to urge the lever 54 upwardly through the opening 80 into engagement with the edge 52. Thus, even the substantial impact loads commonly imparted to the railway cars will not effect movement of the gate 18 toward an open position.

A salient feature of the present invention is the ability to automatically remove the stop member 50 from the path of movement of the gate 18 upon turning movement of the operating shaft 34. With the present invention, the stop member 50 is positively removed or driven from the path of movement of gate 18 prior to gate 18 being moved to its open position.

As discussed above, the actuator 82 rotates with the operating shaft 34. Thus, when the operator desires to open the gate 18, the operating shaft 34 is rotated in a clockwise direction as seen in FIG. 5. The rotation of operating shaft 34 causes a lobe on the cam 84 to engage surface [86] *87* of the lever 54 thereby pivoting the lever out of the path of movement of the gate 18.

In the illustrated embodiment, the operating shaft 34 has a predetermined angle of free rotation prior to movement of the gate 18 toward an open position. When the operating shaft 34 is rotated to open the gate 18, the lost motion mechanism prevents immediate opening of the gate 18 and provides a predetermined gate opening delay following initial turning movement of the operating shaft 34. In the illustrated embodiment, the lost motion mechanism allows both pinion gears 46 to remain stationary while rotating operating shaft 34 due to the circular path traversed by the outer extremity of the operating shaft within the slot 86. Embodying the lost motion mechanism as a specifically design slot in each pinion gear ensures that the pinion gears 46 remain in timed relation relative to each other. During the predetermined angle of free rotation of the operating shaft 34, however, the actuator 82 of the lock assembly 36 positively removes the stop member 50 from the path of the gate 18. Preferably, the operating cam 84 requires 25° of shaft rotation before a lobe on the cam 84 contacts surface [86] *87* and an additional 20° of shaft rotation to completely disengage the lever 54 from the gate. As mentioned above, the angle of free rotation is defined by the angular distance separating surfaces 90 and 94 of the recesses 88 defined by the slot 86 in the pinion gears 46.

After the operating shaft 34 has been rotated through its free angle of rotation, the outer surfaces on the operating shaft 34 engage the surfaces 94 on the recesses 88 of slot 86 defined by the pinion gears 46. Continued rotation of the operating shaft 34 causes the pinion gears 46 to rotate resulting in movement of the gate 18 toward an open position. As will be appreciated, the provision of two rows of conjointly driven rack members 42 ensures that the gate 18 opens squarely as it moves along its predetermined path of travel between its extreme positions and does not gouge the sides of the frame or the channels along which it moves.

To effect closure of the gate 18, the rotation of the operating shaft 34 is reversed. As the gate 18 close, the operating cam 84 rotates the lever 54 up and down about its rotational axis 66 until the gate is completely closed. Upon closure of the gate 18, the stop member 50 engages the edge 52 of the gate under the influence of either the spring 72 or the counterweight 98.

The present invention embodies a relatively simple solution to a long standing problem in the railcar industry. Designing the lock assembly actuator as a cam preferably having four equally spaced lobes facilitates assembly of the cam to the operating shaft in that the cam is always properly disposed about the rotational axis of the operating shaft. Moreover, the arms 62 and 64 of the lock bracket 60 can be designed to capture the drive actuator of the lock assembly therebetween thus reducing the number of fasteners and the like required to secure the cam to the operating shaft. Similarly, the pinions 46 may be connected to the operating shaft as with a sliding fit Thus, the present invention is relatively easy to manufacture, is durable, and has a minimum number of parts thereby reducing its cost without detracting from the effectiveness thereof.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. [An] *A gate control* apparatus [for controlling operation of a] *and* railway hopper car discharge gate assembly including a frame defining a generally rectangular discharge opening with a generally rectangular discharge gate mounted on said frame for movement between open and closed positions along a predetermined path of travel, said apparatus comprising:

an operating shaft rotatably supported on said frame adjacent a rear end of said gate, said operating shaft being connected to said gate whereby said gate slidably moves forwardly and rearwardly between *the* open and closed positions in response to rotation of said operating shaft;

a lock assembly carried on said frame and including a displacable stop member which, when said gate is in its closed position, extends into the predetermined path of travel to positively engage an edge of said gate thereby preventing movement of the gate relative to said frame; and wherein a drive is provided between said lock assembly stop member and said operating shaft for positively displacing said stop member from said path of travel of said gate upon rotation of said operating shaft prior to movement of the gate toward [an] *the* open position.

2. The *gate control* apparatus *and railway hopper car discharge gate assembly* according to claim 1 wherein said operating shaft is connected to said gate through pinion gears arranged upon said operating shaft and which intermesh with racks fitted to an underside of said gate.

3. The *gate control* apparatus *and railway hopper car discharge gate assembly* according to claim 1 wherein said stop member is pivotally mounted on said frame for vertical movement about a fixed generally horizontal axis extending generally parallel to said operating shaft.

4. The *gate control* apparatus *and railway hopper car discharge gate assembly* according to claim 1 wherein said drive Includes a cam mounted on said operating shaft for positively displacing said stop member from the path of travel of said gate upon rotation of said operating shaft.

5. The *gate control* apparatus *and railway hopper car discharge gate assembly* according to claim 1 wherein said stop member is resiliently urged by a spring toward an engaging position with said gate.

6. The *gate control* apparatus *and railway hopper car discharge gate assembly* according to claim 1 wherein said stop member is provided with a counterweight for naturally causing said stop member to be urged toward engagement with said gate.

7. The *gate control* apparatus *and railway hopper car discharge gate assembly* according to claim 1 wherein said drive includes a lost motion mechanism for permitting a predetermined range of free rotation of the operating shaft prior to movement of said gate toward [an] *the* open position.

8. [An] *A gate control* apparatus [for controlling operation of a] *and* railway hopper car discharge gate assembly including a frame defining a discharge opening with a discharge gate slidably arranged on said frame for movement along a predetermined [path] *plane* of travel between open and closed positions, said apparatus comprising:

an operating shaft supported for rotation by said frame and operable to selectively move the gate between *the* open and closed positions in response to rotation of said shaft; and a lock assembly carried on said frame and operably coupled to said operating shaft, said lock assembly including a stop member which, when the gate is in [its] *the* closed position, extends into said [path] *plane* of travel to prevent movement of the gate relative to the frame, and wherein said stop member is driven in timed relation relative to movement of said gate such that upon rotation of said operating shaft to move said gate to [an] *the* open position said stop member is automatically removed from the [path] *plane* of [movement] *travel* of the gate prior to movement of the gate toward [its] *the* open position.

9. The *gate control* apparatus *and railway hopper car discharge gate assembly* according to claim 8 wherein said operating shaft is coupled to said gate through a rack and pinion drive mechanism arranged beneath the predetermined [path] *plane* of travel of said gate.

10. The *gate control* apparatus *and railway hopper car discharge gate assembly* according to claim 9 wherein a lost motion mechanism is provided between said operating shaft and said rack and pinion drive mechanism for permitting rotation of said operating shaft through a predetermined range of rotation prior to imparting an opening movement to said gate.

11. The *gate control* apparatus *and railway hopper car discharge gate assembly* according to claim 8 wherein said stop member is mounted on said frame for generally vertical movement relative to the [path] *plane* of travel of said gate.

12. The *gate control* apparatus *and railway hopper car discharge gate assembly* according to claim 8 wherein said stop member of said locking assembly is biased into the [path] *plane* of travel of said gate.

13. The *gate control* apparatus *and railway hopper car discharge gate assembly* according to claim 8 further including an actuator rotatable with and in response to rotation of said operating shaft for positively removing said stop member from the [path]*plane* of [movement] *travel* of the gate.

14. [An] *A gate control* apparatus [for controlling operation of a] *and* railway car discharge gate assembly including a frame defining a generally rectangular discharge opening with a generally rectangular discharge gate mounted on said frame for movement along a predetermined path of travel extending between a forward closed position and a rearward open position, said apparatus comprising:

an operator controlled actuation assembly for moving said gate along its predetermined path of travel between *the* open and closed positions, said actuation assembly including an operating shaft mounted on said frame for rotation about a fixed axis extending generally parallel to a rear edge of said gate and wherein said operating shaft is operably coupled to said gate;

a lock assembly carried on said frame, said lock assembly including a stop member which, when said gate is in its forward closed position, is positioned to wedge against an edge of the gate thereby preventing movement of the gate relative to the frame and which is displacable to a released position to permit said gate to move relative to said frame toward [an] *the* open position;

and wherein a drive including a lost motion mechanism is arranged between said operating shaft and said stop member for automatically effecting, in sequential order and in response to rotation of said operating shaft, displacement of said stop member from the path of travel of said gate and movement of said gate toward [an] *the* open position.

15. The *gate control* apparatus *and railway hopper car discharge gate assembly* according to claim 14 wherein said actuation assembly further includes a rack and pinion drive assembly comprised of a pair of laterally spaced pinion gears mounted on said operating shaft for engagement with a pair of laterally spaced racks fixed to an undersurface of said gate.

16. The *gate control* apparatus *and railway hopper car discharge gate assembly* according to claim 14 wherein said stop member of said lock assembly includes a lever pivotally mounted on the frame for rocking movement about an axis extending generally parallel to said operating shaft, with one end of said lever being adapted to positively engage and wedge against said gate edge.

17. The *gate control* apparatus *and railway hopper car discharge gate assembly* according to claim 16 wherein said lock assembly further includes a spring member for resiliently urging said lever into engagement with said gate.

18. The *gate control* apparatus *and railway hopper car discharge gate assembly* according to claim [14] *16* wherein said drive further includes a cam mounted on and for rotation with said operating shaft for engaging said lever in a manner positively displacing the lever to a released position in response to rotation of said operating shaft.

19. The *gate control* apparatus *and railway hopper car discharge gate assembly* according to claim 14 wherein said operating shaft is operably coupled to said gate through a rack and pinion assembly, and wherein said lost motion mechanism includes a specifically configured slot defined by pinions of said rack and pinion assembly for allowing said operating shaft to rotate through a predetermined angle of rotation prior to imparting motion to said pinions and thereby movement of the gate.

20. The *gate control* apparatus *and railway hopper car discharge gate assembly* according to claim 19 wherein said lost motion mechanism incorporates a dwell period during which a cam member carried on the operating shaft is rotated into engagement with the stop member and an actuating period during which the cam member is rotated to positively move the stop member to a released position prior to movement of the gate toward [an] *the* open position.

*21. A gate control apparatus and railway hopper car discharge gate assembly including a frame defining a generally rectangular discharge opening with a generally rectangular discharge gate mounted on said frame for movement between open and closed positions along a predetermined path of travel, said apparatus comprising:*

*an operating shaft rotatably supported on said frame adjacent an end of said opening, said operating shaft being connected to said gate whereby said gate slidably moves between the open and closed positions in response to rotation of said operating shaft;*

*a lock assembly including a displacable stop member which, when said gate is in its closed position, prevents movement of the gate relative to said frame; and*

*wherein a drive is provided between said lock assembly stop member and said operating shaft for positively displacing said stop member prior to movement of the gate.*

*22. The gate control apparatus and railway hopper car discharge gate assembly according to claim 21 wherein said operating shaft is connected to said gate through pinion gears arranged upon said operating shaft and which intermesh with racks fitted to an underside of said gate.*

*23. The gate control apparatus and railway hopper car discharge gate assembly according to claim 21 wherein said stop member is pivotally mounted for vertical movement about a fixed generally horizontal axis extending generally parallel to said operating shaft.*

*24. The gate control apparatus and railway hopper car discharge gate assembly according to claim 21 wherein said drive includes a cam mounted on said operating shaft for positively displacing said stop member upon rotation of said operating shaft.*

*25. The gate control apparatus and railway hopper car discharge gate assembly according to claim 21 wherein said lock assembly further comprises a spring for resiliently urging said stop member into a position to prevent movement of said gate.*

*26. The gate control apparatus and railway hopper car discharge gate assembly according to claim 21 wherein said drive includes a lost motion mechanism for permitting a predetermined range of free rotation of the operating shaft prior to movement of said gate.*

*27. A gate control apparatus and railway hopper car discharge gate assembly including a frame defining a discharge opening with a discharge gate slidably arranged on said frame for movement along a predetermined plane of travel between open and closed positions, said apparatus comprising:*

*an operating shaft supported for rotation by said frame and operable to selectively move the gate between the open and closed positions in response to rotation of said shaft; and*

*a lock assembly operably coupled to said operating shaft, said lock assembly including a stop member which, when the gate is in the closed position, prevents movement of the gate relative to the frame, and wherein said stop member is driven in timed relation relative to movement of said gate such that upon rotation of said operating shaft to move said gate to the open position said stop member is automatically displaced from the plane of travel of the gate prior to movement of the gate.*

*28. The gate control apparatus and railway hopper car discharge gate assembly according to claim 27 wherein said operating shaft is coupled to said gate through a rack and pinion drive mechanism arranged beneath the predetermined plane of travel of said gate.*

*29. The gate control apparatus and railway hopper car discharge gate assembly according to claim 28 where a lost motion mechanism is provided between said operating shaft and said rack and pinion drive mechanism for permitting rotation of said operating shaft through a predetermined range of rotation prior to imparting an opening movement to said gate.*

*30. The gate control apparatus and railway hopper car discharge gate assembly according to claim 27 wherein said stop member is mounted for generally vertical movement.*

*31. The gate control apparatus and railway hopper car discharge gate assembly according to claim 27 wherein said lock assembly further includes a spring for resiliently urging said stop member into a position to prevent movement of said gate.*

*32. The gate control apparatus and railway hopper car discharge gate assembly according to claim 27 further including an actuator rotatable with and in response to rotation of said operating shaft for effecting automatic displacement of the stop member prior to movement of the gate.*

*33. A gate control apparatus and railway car discharge gate assembly including a frame defining a generally rectangular discharge opening with a generally rectangular discharge gate mounted on said frame for movement along a predetermined path of travel extending between a closed position and an open position, said apparatus comprising:*

*an operator controlled actuation assembly for moving said gate along its predetermined path of travel between the open and closed positions, said actuation assembly including an operating shaft mounted on said frame for rotation about a fixed axis extending generally parallel to an edge of said gate and wherein said operating shaft is operably coupled to said gate;*

*a lock assembly including a stop member which, when said gate is in its closed position, is positioned to prevent movement of the gate relative to the frame and which is displacable to a released position to permit said gate to move relative to said frame toward the open position;*

*and wherein a drive including a lost motion mechanism is arranged between said operating shaft and said stop member for automatically effecting, in sequential order and in response to rotation of said operating shaft, displacement of said stop member and movement of said gate.*

*34. The gate control apparatus and railway hopper car discharge gate assembly according to claim 33 wherein said actuation assembly further includes a rack and pinion drive assembly comprised of a pair of laterally spaced pinion gears mounted on said operating shaft for engagement with a pair of laterally spaced racks operably to an undersurface of said gate.*

*35. The gate control apparatus and railway hopper car discharge gate assembly according to claim 33 wherein said stop member of said lock assembly includes a lever pivotally mounted for rocking movement about an axis extending generally parallel to said operating shaft.*

*36. The gate control apparatus and railway hopper car discharge gate assembly according to claim 35 wherein said lock assembly further includes a spring for resiliently urging said lever into a position to prevent movement of said gate.*

*37. The gate control apparatus and railway hopper car discharge gate assembly according to claim 33 wherein said drive further includes a cam mounted on and for rotation with said operating shaft for engaging said lever in a manner positively displacing the lever to a released position in response to rotation of said operating shaft.*

*38. The gate control apparatus and railway hopper car discharge gate assembly according to claim 33 wherein said operating shaft is operably coupled to said gate through a rack and pinion assembly, and wherein said lost motion mechanism includes a specifically configured slot defined by pinions of said rack and pinion assembly for allowing said operating shaft to rotate through a predetermined angle of rotation prior to imparting motion to said pinions and thereby movement of the gate.*

*39. The gate control apparatus and railway hopper car discharge gate assembly according to claim 38 wherein said lost motion mechanism incorporates a dwell period during which a cam member carried on the operating shaft is rotated into engagement with the stop member and an actuating period during which the cam member is rotated to positively move the stop member to a released position prior to movement of the gate.*

*40. A gate control apparatus and railway hopper car discharge gate assembly including a frame defining a generally rectangular discharge opening with a generally rectangular discharge gate mounted on said frame for movement between open and closed positions along a predetermined path of travel, said apparatus comprising:*

*an operating shaft assembly rotatably supported on said frame adjacent an end of said opening, said operating shaft assembly being connected to said gate whereby said gate slidably moves between the open and closed positions in response to rotation of said operating shaft assembly, said operating shaft assembly including capstans at opposite ends of a shaft;*

*a lock assembly carried on said frame and including a displacable stop member which, when said gate is in the closed position, extends into the predetermined path of travel to positively engage an edge of said rate thereby preventing movement of the gate relative to said frame; and*

*wherein a drive is provided between said lock assembly stop member and said operating shaft assembly for positively displacing said stop member from said path of travel of said gate upon rotation of one of said capstans of said operating shaft assembly prior to movement of the gate toward the open position.*

*41. The gate control apparatus and railway hopper car discharge gate assembly according to claim 40 wherein said operating shaft assembly is connected to said gate through pinion gears arranged upon said operating shaft assembly and which intermesh with racks fitted to an underside of said gate.*

*42. The gate control apparatus and railway hopper car discharge gate assembly according to claim 40 wherein said stop member is pivotally mounted on said frame for vertical movement about a fixed generally horizontal axis extending generally parallel to said operating shaft assembly.*

*43. The gate control apparatus and railway hopper car discharge gate assembly according to claim 40 wherein said drive includes a cam mounted on said operating shaft assembly for positively displacing said stop member from the path of travel of said gate upon rotation of a portion of said operating shaft assembly.*

*44. The gate control apparatus and railway hopper car discharge gate assembly according to claim 40 wherein said stop member is resiliently urged by a spring toward an engaging position with said gate.*

*45. The gate control apparatus and railway hopper car discharge gate assembly according to claim 40 wherein said drive includes a lost motion mechanism for permitting a predetermined range of free rotation of one of said capstans of the operating shaft assembly prior to movement of said gate toward the open position.*

*46. A gate control apparatus and railway hopper car discharge gate assembly including a frame defining a discharge opening with a discharge gate slidably arranged on said frame for movement along a predetermined plane of travel between open and closed positions, said apparatus comprising:*

*an operating shaft assembly supported for rotation by said frame and operable to selectively move the gate between the open and closed positions in response to rotation of said operating shaft assembly, said operating shaft assembly including capstans at opposite ends of a shaft; and*

*a lock assembly carried on said frame and operably coupled to said operating shaft assembly, said lock assembly including a stop member which, when the gate is in its closed position, extends into said plane of travel to prevent movement of the gate relative to the frame, and wherein said stop member is driven in timed relation relative to movement of said crate such that upon rotation of one of said capstans of said operating shaft assembly to move said rate to the open position said stop member is automatically removed from the plane of travel of the gate prior to movement of the sate toward the open position.*

*47. The gate control apparatus and railway hopper car discharge gate assembly according to claim 46 wherein said operating shaft assembly is coupled to said gate through a rack and pinion drive mechanism arranged beneath the predetermined plane of travel of said gate.*

*48. The gate control apparatus and railway hopper car discharge gate assembly according to claim 47 where a lost motion mechanism is provided between said operating shaft assembly and said rack and pinion drive mechanism for permitting rotation of one of said capstans of said operating shaft assembly through a predetermined range of rotation prior to imparting an opening movement to said gate.*

*49. The gate control apparatus and railway hopper car discharge gate assembly according to claim 46 wherein said stop member is mounted on said frame for generally vertical movement relative to the plane of travel of said gate.*

*50. The gate control apparatus and railway hopper car discharge gate assembly according to claim 46 wherein said stop member of said locking assembly is biased into the plane of travel of said gate.*

*51. The gate control apparatus and railway hopper car discharge gate assembly according to claim 46 further including an actuator rotatable with and in response to rotation of a portion of said operating shaft assembly for positively removing said stop member from the plane of travel of the gate.*

*52. A gate control apparatus and railway hopper discharge gate assembly including a frame defining a generally rectangular discharge opening with a generally rectangular discharge gate mounted on said frame for movement along a predetermined path of travel extending between a closed position and an open position, said apparatus comprising:*

*an operator controlled actuation assembly for moving said gate along its predetermined path of travel between the open and closed positions, said actuation*

*assembly including an operating shaft and capstans connected to opposite ends of the operating shaft for rotation about a fixed axis extending generally parallel to an edge of said gate and wherein said actuation assembly is operably coupled to said gate;*

*a lock assembly carried on said frame, said lock assembly including a stop member which, when said gate is in the closed position, is positioned to wedge against an edge of the gate thereby preventing movement of the gate relative to the frame and which is displacable to a released position to permit said gate to move relative to said frame toward the open position;*

*and wherein a drive including a lost motion mechanism is arranged between said actuation assembly and said stop member for automatically effecting, in sequential order and in response to rotation of one of said capstans of said actuation assembly, displacement of said stop member from the path of travel of said gate and movement of said gate toward the open position.*

*53. The gate control apparatus and railway hopper car discharge gate assembly according to claim 52 wherein said actuation assembly further includes a rack and pinion drive assembly comprised of a pair of laterally spaced pinion gears mounted on said operating shaft for engagement with a pair of laterally spaced racks operably fixed to an undersurface of said gate.*

*54. The gate control apparatus and railway hopper car discharge gate assembly according to claim 52 wherein said stop member of said lock assembly includes a lever pivotally mounted on the frame for rocking movement about an axis extending generally parallel to said operating shaft, with one end of said lever being adapted to positively engage and wedge against said gate edge.*

*55. The gate control apparatus and railway hopper car discharge gate assembly according to claim 54 wherein said lock assembly further includes a spring member for resiliently urging said lever into engagement with said gate.*

*56. The gate control apparatus and railway hopper car discharge gate assembly according to claim 54 wherein said drive further includes a cam mounted on and for rotation with said operating shaft for engaging said lever in a manner positively displacing the lever to a released position in response to rotation of a portion of said actuation assembly.*

*57. The gate control apparatus and railway hopper car discharge gate assembly according to claim 52 wherein said operating shaft is operably coupled to said gate through a rack and pinion assembly, and wherein said lost motion mechanism includes a specifically configured slot defined by pinions of said rack and pinion assembly for allowing one of said capstans of said actuation assembly to rotate through a predetermined angle of rotation prior to imparting motion to said pinions and thereby movement of the gate.*

*58. The gate control apparatus and railway hopper car discharge gate assembly according to claim 57 wherein said lost motion mechanism incorporates a dwell period during which a cam member carried on the operating shaft is rotated into engagement with the stop member and an actuating period during which the cam member is rotated to positively move the stop member to a released position prior to movement of the gate toward the open position.*

*59. A gate control apparatus and railway hopper car discharge gate assembly including a frame defining a generally rectangular discharge opening with a generally rectangular discharge gate mounted on said frame for movement between open and closed positions along a predetermined path of travel, said apparatus comprising:*

*an operating shaft assembly rotatably supported on said frame adjacent an end of said opening, said operating shaft assembly being connected to said gate whereby said gate slidably moves between the open and closed positions in response to rotation of said operating shaft assembly, said operating shaft assembly including capstans at opposite ends of a shaft;*

*a lock assembly including a displacable stop member which, when said gate is in its closed position, prevents movement of the gate relative to said frame; and*

*wherein a drive is provided between said lock assembly stop member and said operating shaft assembly for positively displacing said stop member prior to movement of the gate.*

*60. The gate control apparatus and railway hopper car discharge gate assembly according to claim 59 wherein said operating shaft assembly is connected to said gate through pinion gears arranged upon said operating shaft assembly and which intermesh with racks fitted to an underside of said gate.*

*61. The gate control apparatus and railway hopper car discharge gate assembly according to claim 59 wherein said stop member is pivotally mounted for vertical movement about a fixed generally horizontal axis extending generally parallel to said operating shaft assembly.*

*62. The gate control apparatus and railway hopper car discharge gate assembly according to claim 59 wherein said drive includes a cam mounted on said operating shaft assembly for positively displacing said stop member upon rotation of said operating shaft assembly.*

*63. The gate control apparatus and railway hopper car discharge gate assembly according to claim 59 wherein said lock assembly further comprises a spring for resiliently urging said stop member into a position to prevent movement of said gate.*

*64. The gate control apparatus and railway hopper car discharge gate assembly according to claim 59 wherein said drive includes a lost motion mechanism for permitting a predetermined range of free rotation of one of said capstans of the operating shaft assembly prior to movement of said gate.*

*65. A gate control apparatus and railway hopper car discharge gate assembly including a frame defining a discharge opening with a discharge gate slidably arranged on said frame for movement along a predetermined plane of travel between open and closed positions, said apparatus comprising:*

*an operating shaft assembly supported for rotation by said frame and operable to selectively move the gate between the open and closed positions in response to rotation of said operating shaft assembly, said operating shaft assembly including capstans at opposite ends of a shaft; and*

*a lock assembly operably coupled to said operating shaft assembly, said lock assembly including a stop member which, when the gate is in the closed position, prevents movement of the gate relative to the frame, and wherein said stop member is driven in timed relation relative to movement of said gate such that upon rotation of one of said capstans of said operating shaft assembly to move said gate to the open position said stop member is automatically displaced from the plane of travel of the gate prior to movement of the gate.*

*66. The gate control apparatus and railway hopper car discharge gate assembly according to claim 65 wherein said operating shaft assembly is coupled to said gate through a rack and pinion drive mechanism arranged beneath the predetermined plane of travel of said gate.*

*67. The gate control apparatus and railway hopper car discharge gate assembly according to claim 66 wherein a lost motion mechanism is provided between said operating shaft assembly and said rack and pinion drive mechanism for permitting rotation of one of said capstans of said operating shaft assembly through a predetermined range of rotation prior to imparting an opening movement to said gate.*

*68. The gate control apparatus and railway hopper car discharge gate assembly according to claim 65 wherein said stop member is mounted for generally vertical movement.*

*69. The gate control apparatus and railway hopper car discharge gate assembly according to claim 65 wherein said lock assembly further includes a spring for resiliently urging said stop member into a position to prevent movement of said gate.*

*70. The gate control apparatus and railway hopper car discharge gate assembly according to claim 65 further including an actuator rotatable with and in response to rotation of said operating shaft assembly for effecting automatic displacement of the stop member prior to movement of the gate.*

*71. A gate control apparatus and railway hopper car discharge gate assembly including a frame defining a generally rectangular discharge opening with a generally rectangular discharge gate mounted on said frame for movement along a predetermined path of travel extending between a closed position and an open position, said apparatus comprising:*

*an operator controlled actuation assembly for moving said gate along its predetermined path of travel between the open and closed positions, said actuation assembly including an operating shaft and capstans connected to opposite ends of the operating shaft for rotation about a fixed axis extending generally parallel to an edge of said gate and wherein said actuation assembly is operably coupled to said gate;*

*a lock assembly including a stop member which, when said gate is in its closed position, is positioned to prevent movement of the gate relative to the frame and which is displacable to a released position to permit said gate to move relative to said frame toward the open position;*

*and wherein a drive including a lost motion mechanism is arranged between said actuation assembly and said stop member for automatically effecting, in sequential order and in response to rotation of one of said capstans of said actuation assembly, displacement of said stop member and movement of said gate.*

*72. The gate control apparatus and railway hopper car discharge gate assembly according to claim 71 wherein said actuation assembly further includes a rack and pinion drive assembly comprised of a pair of laterally spaced pinion gears mounted on said operating shaft for engagement with a pair of laterally spaced racks operably fixed to an undersurface of said gate.*

*73. The gate control apparatus and railway hopper car discharge gate assembly according to claim 71 wherein said stop member of said lock assembly includes a lever pivotally mounted for rocking movement about an axis extending generally parallel to said operating shaft.*

*74. The gate control apparatus and railway hopper car discharge gate assembly according to claim 73 wherein said lock assembly further includes a spring for resiliently urging said lever into a position to prevent movement of said gate.*

*75. The gate control apparatus and railway hopper car discharge gate assembly according to claim 73 wherein said drive further includes a cam mounted on and for rotation with said operating shaft for engaging said lever in a manner positively displacing the lever to a released position in response to rotation of said actuation assembly.*

*76. The gate control apparatus and railway hopper car discharge gate assembly according to claim 71 wherein said operating shaft is operably coupled to said gate through a rack and pinion assembly, and wherein said lost motion mechanism includes a specifically configured slot defined by pinions of said rack and pinion assembly for allowing one of said capstans of said actuation assembly to rotate through a predetermined angle of rotation prior to imparting motion to said pinions and thereby movement of the gate.*

*77. The gate control apparatus and railway hopper car discharge gate assembly according to claim 76 wherein said lost motion mechanism incorporates a dwell period during which a cam member carried on the operating shaft is rotated into engagement with the stop member and an actuating period during which the cam member is rotated to positively move the stop member to a released position prior to movement of the gate.*

* * * * *